Patented Apr. 20, 1937

2,077,448

UNITED STATES PATENT OFFICE 2,077,448

PROCESS OF CHILLPROOFING AND STABILIZING BEERS AND ALES

Leo Wallerstein, New York, N. Y.

No Drawing. Application June 1, 1936, Serial No. 82,924

13 Claims. (Cl. 99—36)

The present invention relates to improvements in beers, ales and other fermented malt beverages.

In Patent No. 995,824 to Leo Wallerstein, dated January 20, 1911, there is disclosed a method of chill-proofing bottled beers by adding pepsin in its normal state of activity thereto.

I have now discovered that when proteolytic enzyme preparation of animal origin, active in acid media and particularly pepsin, kathepsin and so forth are mixed with metabolic products derived by the growth of certain fungi or molds, that their action is substantially enhanced and superior chill-proofing and stabilization of the malt beverage is obtained, with most economical utilization of said enzymes.

It has been found that with such mixtures, superior chill-proofing and stability will result as compared to the effect of the protease preparations singly.

For example, the beer or ale treated with the combinations of the present invention will remain chill-proof for a much longer time, as for example, when it has been in a bottle for many weeks and months. Pasteurized or germ-filtered beers so treated will keep their brilliancy for long periods, both at ordinary and low temperatures, and even though they be subjected to repeated changes in temperature ranging from freezing up to room temperatures.

This desirable enhanced activity is obtained when the pepsin, kathepsin or other similar enzyme preparations of animal origin are combined with the metabolic products derived by the cultivation of fungi and molds, particularly of the genera, Aspergillus, Amylomyces, Mucor and Penicillium. Among the preferred members of this group are the *Aspergillus oryzae* and *wentii*, *Amylomyces rouxii* and *Mucor delemar*.

In carrying out the present invention, mixtures, such as those above referred to, are added to beer, ale or other malt beverages at any suitable stage in the production, preferably after boiling of the wort.

While the addition may be made at one time or at different times, before, during or after fermentation, the addition of small proportions of the composite preparations after the main fermentation and during storage has been found satisfactory. It has also been found satisfactory to add these mixtures to the clarified beer shortly before bottling.

The preferred proportions include the addition of 1 to 10 grams of the preparation to each barrel of beer, each barrel containing 31 gallons of beverage. Of this 1 to 10 grams, from 0.5 to 5 grams may consist of pepsin, or other animal enzymes, singly or in combination, while the other 0.5 to 5 grams may consist of the preparations derived from one or more of the above specified micro-organisms. The latter metabolic preparations should preferably not be used in the mixture in greater amounts than the former.

When Aspergillus, Mucor, Amylomyces or Penicillium are cultivated to produce the metabolic products the following procedure is found to be satisfactory.

A culture medium, preferably consisting of comminuted or broken grains of cereals, such as wheat, corn, oats and barley, from which a greater part of the starchy material has been removed, is suitably moistened with water and thoroughly sterilized. The culture medium may consist of bran shorts or middlings. Other media may be utilized, such as residues from beer brewing, alcohol fermentation processes, and so forth.

After the sterilization of the culture media, as for example with steam, the spores of the desired fungus or mold are sown therein; the moisture of the media may vary, but preferably ranges between 40% to 60% by weight.

After sowing the fungus seed spores upon the culture media, the entire mass is preferably formed into a bed, although this is not essential. This bed is maintained in a moist atmosphere at a uniform temperature varying from 35° to 45° C. and preferably not exceeding the latter limit.

The growth may be continued while agitating the mass by stirring or the mass may be permitted to lie in quiescent condition. In the former case the thickness of the mass preferably is increased to 2 to 3 feet, while in the latter case the bed of material is kept fairly thin, as for example, from 1 to 2 inches in thickness to provide for aeration.

The fungus or mold growth is permitted to continue from 3 to 5 days and then the metabolic preparation is extracted by lixiviating the mass with water.

After this extraction, the liquor is separated from the fungi or mold growth and the culture material. For example, the growths and culture material may be removed by high speed centrifuges or by filtration. It must be done, however, under conditions to prevent infection. This is best accomplished either by operating at very low temperatures and/or preferably by the addition of suitable antiseptics, such as sulfites or alcohol, to the metabolic liquor.

It is desirable to concentrate the active principles contained in the metabolic liquor and to use the concentrated preparation which is more stable and may readily be stored, packaged and transported.

In order to prepare such a concentrated product, the active principles contained in the liquor are precipitated from this liquor by the addition of alcohol or acetone. As a general rule from one to two volumes of these precipitating agents are sufficient for every volume of liquor to be precipitated.

Another method of concentrating these enzymatic substances consists in salting out the active principles by the addition to the metabolic liquors of about an equal volume of a saturated ammonium sulfate solution. In either method of concentration the precipitated material is separated by centrifuging or filtration and dried at a lower temperature, preferably at about less than 40° C.

Only comparatively small amounts of these concentrated metabolic materials are needed to accomplish the enhancement of pepsin, kathepsin or other animal enzyme.

Mixtures, as described above, not only give improved chill-proofing and stability with more economical utilization of animal enzymes, but in addition most satisfactorily modify carbohydrate and protein materials in the beverage to give improved flavor, taste, and quality.

The present invention is a continuation in part of application Serial No. 759,738, filed December 29, 1934, and metabolic products of *B. mesentericus* or *subtilis* produced as described in said application and also plant enzymes, such as papain, bromelin and malt enzymes may be included.

The various combinations disclosed according to the present application have a better action not only in chill-proofing the beer, but also in otherwise improving its quality than would be expected from the additive effect of the materials themselves.

It is to be understood that many variations and modifications may be practiced without departing from the scope of the present invention, the above examples having merely been given by way of illustration, and not by way of limitation.

The present application is similar in subject matter to the applications Ser. Nos. 668,986, filed May 2, 1933, now Patent No. 2,011,095; and 672,039, filed May 20, 1933, now Patent No. 2,011,096, which relate to process of treating, stabilizing, maturing and/or ripening beers and ales by the additions of metabolic products derived from certain types of bacilli and molds. Enhanced enzyme mixtures containing pepsin and papain with or without one or more of said metabolic products, other than those claimed specifically in the present application, are more fully covered in the co-pending applications Ser. Nos. 759,738, filed Dec. 29, 1934; 82,925, filed June 1, 1936; and 668,987, filed May 2, 1933, all of which are being issued upon even date herewith.

I claim:

1. The process of chill-proofing and stabilizing malt beverage which comprises adding thereto an enzymatic composition including pepsin and a metabolic material produced by cultivation of molds selected from the group consisting of genera Aspergillus, Penicillium, Amylomyces and Mucor.

2. The process of chill-proofing and stabilizing malt beverage which comprises adding thereto an enzymatic composition including pepsin and a metabolic material produced by cultivation of *Aspergillus oryzae*.

3. The process of chill-proofing and stabilizing malt beverage which comprises adding thereto an enzymatic composition including pepsin and a metabolic material produced by cultivation of Aspergillus.

4. The process of chill-proofing and stabilizing malt beverage which comprises adding thereto an enzymatic composition including pepsin and a metabolic material produced by cultivation of *Mucor delemar*.

5. The process of chill-proofing and stabilizing malt beverage which comprises adding thereto an enzymatic composition including a proteolytic enzyme of animal origin, which is active in acid media, and a metabolic material produced by cultivation of molds selected from the group consisting of genera Aspergillus, Penicillium, Mucor and Amylomyces.

6. The process of chill-proofing and stabilizing malt beverage which comprises adding thereto an enzymatic composition including a metabolic product derived by the cultivation of a mold, said mold being selected from the group consisting of the genera Aspergillus, Mucor, Penicillium, and Amylomyces and a proteolytic enzyme of animal origin which is active in acid media, said addition being after fermentation.

7. The process of chill-proofing and stabilizing malt beverages which comprises adding thereto an enzymatic composition including a mold metabolic material, said mold being selected from the group consisting of the genera Aspergillus, Mucor, Penicillium, and Amylomyces and a proteolytic enzyme of animal origin, which is active in acid media, said addition taking place after the boiling of the wort.

8. The process of chill-proofing and stabilizing malt beverage which comprises adding thereto an enzymatic composition including a mold metabolic material, said mold being selected from the group consisting of the genera Aspergillus, Mucor, Penicillium, and Amylomyces and a proteolytic enzyme of animal origin, which is active in acid media, said composition being added in the proportion of 1 to 10 grams for every 31 gallons of the beverage.

9. A chill-proofing and stabilizing enzymatic mixture for beers and ales, comprising pepsin enhanced by a metabolic material derived by the cultivation of molds selected from the group consisting of the genera Aspergillus, Mucor, Penicillium, and Amylomyces.

10. A chill-proofing and stabilizing enzymatic mixture for beers and ales, comprising kathepsin enhanced by a metabolic material derived by the cultivation of molds selected from the group consisting of the genera Aspergillus, Mucor, Penicillium, and Amylomyces.

11. A chill-proofing and stabilizing enzymatic mixture for beers and ales, comprising pepsin enhanced by a metabolic material derived by the cultivation of *Aspergillus oryzae*.

12. A chill-proofing and stabilizing enzymatic mixture for beers and ales, comprising pepsin enhanced by a metabolic material derived by the cultivation of Aspergillus.

13. A chill-proofing and stabilizing enzymatic mixture for beers and ales, comprising pepsin enhanced by a metabolic material derived by the cultivation of *Mucor delemar*.

LEO WALLERSTEIN.